United States Patent
Sung et al.

(10) Patent No.: US 7,626,677 B2
(45) Date of Patent: Dec. 1, 2009

(54) LIQUID CRYSTAL DISPLAY APPARATUS

(75) Inventors: Wen-Fang Sung, Hsinchu (TW); Ying-Che Lan, Hsinchu (TW); Chih-Haw Wang, Hsinchu (TW); Pei-Hsun Wu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 124 days.

(21) Appl. No.: 11/757,562

(22) Filed: Jun. 4, 2007

(65) Prior Publication Data
US 2008/0123027 A1    May 29, 2008

(30) Foreign Application Priority Data
Nov. 28, 2006  (TW) .............................. 95143932 A (51) Int. Cl.
  C09K 19/02  (2006.01)
(52) U.S. Cl. .................. 349/181; 349/180; 349/122
(58) Field of Classification Search ................ 349/122, 349/180, 181
  See application file for complete search history.

(56) References Cited

U.S. PATENT DOCUMENTS

2007/0030418 A1*  2/2007  Ham .......................... 349/96

FOREIGN PATENT DOCUMENTS

| CN | 1673831 | 9/2005 |
| CN | 1811555 | 8/2006 |

* cited by examiner

Primary Examiner—Frank G Font
Assistant Examiner—Eric Wong
(74) Attorney, Agent, or Firm—J.C. Patents (57) ABSTRACT

A liquid crystal display apparatus includes a first protective layer, a first polarizing layer, a second protective layer, an active device array substrate, an opposite substrate, a twisted nematic liquid crystal layer, a third protective layer, a second polarizing layer and a fourth protective layer. The first polarizing layer is disposed between the first and the second protective layers; the active device array substrate is disposed over the second protective layer. The twisted nematic liquid crystal layer is disposed between the opposite substrate and the active device array substrate. The third protective layer is disposed on the opposite substrate, and the second polarizing layer is disposed between the third and the fourth protective layers. The second protective layer has an in-plane and an out-of-plane retardation values. The in-plane retardation value is between 1 and 10 nanometers, and the out-of-plane retardation value is between 50 and 130 nanometers.

15 Claims, 12 Drawing Sheets

LIQUID CRYSTAL DISPLAY APPARATUS

CROSS-REFERENCE TO RELATED APPLICATION

This application claims the priority benefit of Taiwan application Ser. No. 95143932, filed Nov. 28, 2006. All disclosure of the Taiwan application is incorporated herein by reference.

BACKGROUND OF THE INVENTION

1. Field of the Invention

The present invention relates to a liquid crystal display apparatus, and especially to a twisted nematic liquid crystal display apparatus having a wide view angle.

2. Description of Related Art

Ever since the liquid crystal display was invented, it has fulfilled the consumer's expectations and demands on thin and light designs for a display with its light weight, thinness, and small size. Moreover, compared with the cathode ray tube (CRT) display, the liquid crystal display has excellent features such as low power consumption and low radiation, which make the liquid crystal display one of the most important electronic products in today's human life.

However, the liquid crystal display is limited by its principle of light emission. There remain some problems that urgently need mitigating. For instance, the range of the view angle in the liquid crystal display is too narrow. When people view the liquid crystal display apparatus with a larger horizontal or vertical view angle, the display quality is then lowered. That is, the contrast ratio, the color saturation and the luminance of the liquid crystal display apparatus are not as good as during a right view.

Furthermore, the definition of a view angle is the angle when the contrast of a display is smaller than 10. The liquid crystal display is generally indicated in eight-digit gray scales, i.e. 256 different gray scales, with the zero gray scale being the full black state, and the 255 gray scale being the full white state. Normally, a liquid crystal display in a high level state is brighter than one in a low level state. If the luminance of a liquid crystal display in a low level state is instead brighter than the luminance of one in a high level state, it is called the gray scale inversion. This phenomenon usually happens when people view the liquid crystal display with a too wide view angle.

Generally, the twisted nematic-LCD (TN-LCD) has the smallest view angle range because the twist angle of a liquid crystal atom is smaller. The horizontal view angle is only around 45 degrees on both the right and the left directions, which still leaves much room for improvement. Therefore, in order to solve the problem of the view angle, a compensation film is used to widen the view angle of the twisted nematic LCD.

Figure 1:
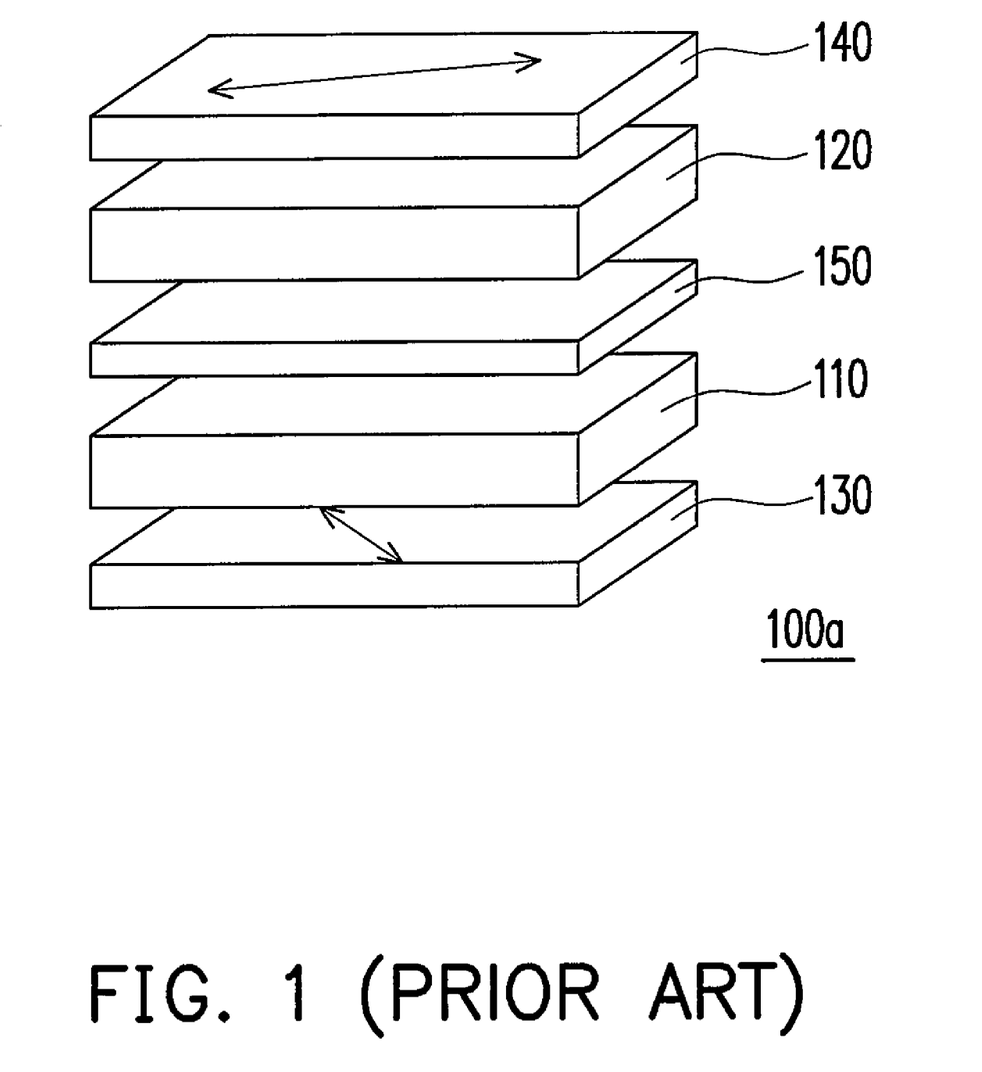
FIG. 1 is a schematic view showing the structure of a conventional twisted nematic liquid crystal display.

FIG. 1 is a schematic view showing the structure of a conventional twisted nematic LCD apparatus. Referring to FIG. 1, this twisted nematic LCD apparatus 100a generally includes a thin film transistor (TFT) array substrate 110, a color filter (CF) substrate 120, a first polarizer 130, a second polarizer 140, a twisted nematic liquid crystal layer 150. The TFT array substrate 110 is disposed on the first polarizer 130, and the color filter substrate 120 is disposed over the TFT array substrate 110. The second polarizer 140 is disposed on the color filter substrate 120, and the twisted nematic liquid crystal layer 150 is disposed between the TFT array substrate 110 and the color filter substrate 120.

Figure 2:
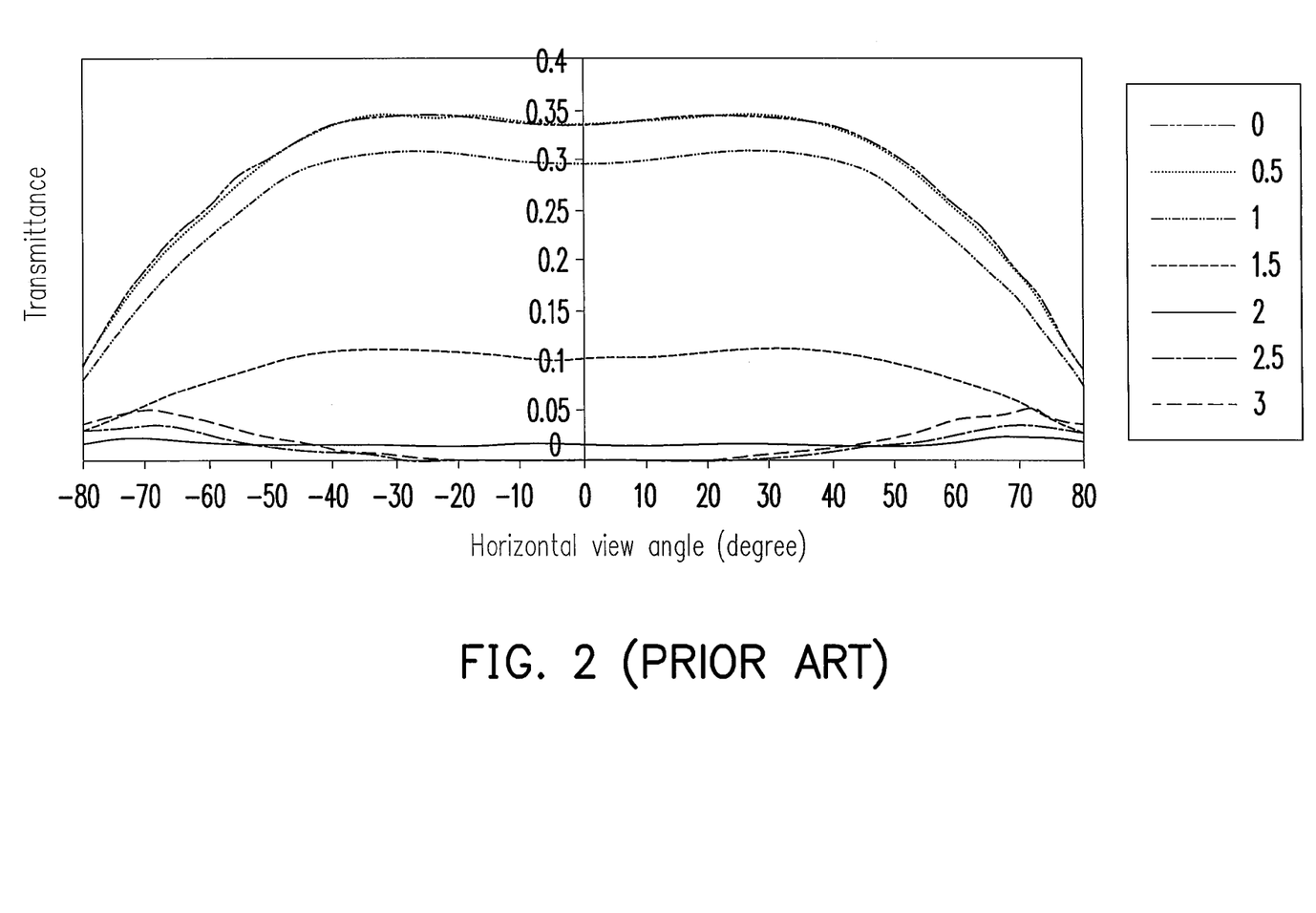

FIG. 2 is the measurement results of the horizontal view angles of the conventional twisted nematic LCD apparatus 100a. Referring to FIG. 2, the horizontal axis is the horizontal view angle, the vertical axis is the transmittance, and the vertical axis also represents luminance. In addition, different curves show the results of the conventional twisted nematic liquid crystal display apparatus 100a under different operating voltages.

It can be seen from FIG. 2 that when the conventional twisted nematic LCD apparatus 100a is at zero volt, since the twisted nematic LCD apparatus 100a is in a high gray scale display state, the LCD has the highest transmittance at this moment. It indicates the conventional twisted nematic LCD apparatus 100a has the highest luminance. Afterwards as the operating voltage increases, the luminance displayed on the conventional twisted nematic LCD apparatus 100a gradually decreases. It is noted that around 45 degrees and −45 degrees on the horizontal axis as shown in FIG. 2, some curves cross one another at this section, which indicates the transmittance at high operating voltages is higher than the transmittance at low operating voltages. In other words, the luminance in low gray scales is brighter than the luminance in high gray scales; this phenomenon is the foregoing gray scale inversion. In view of the above, the view angle range of the conventional twisted nematic liquid crystal display apparatus 100a is only 45 degrees on the right and the left along the horizontal direction.

Figure 3:
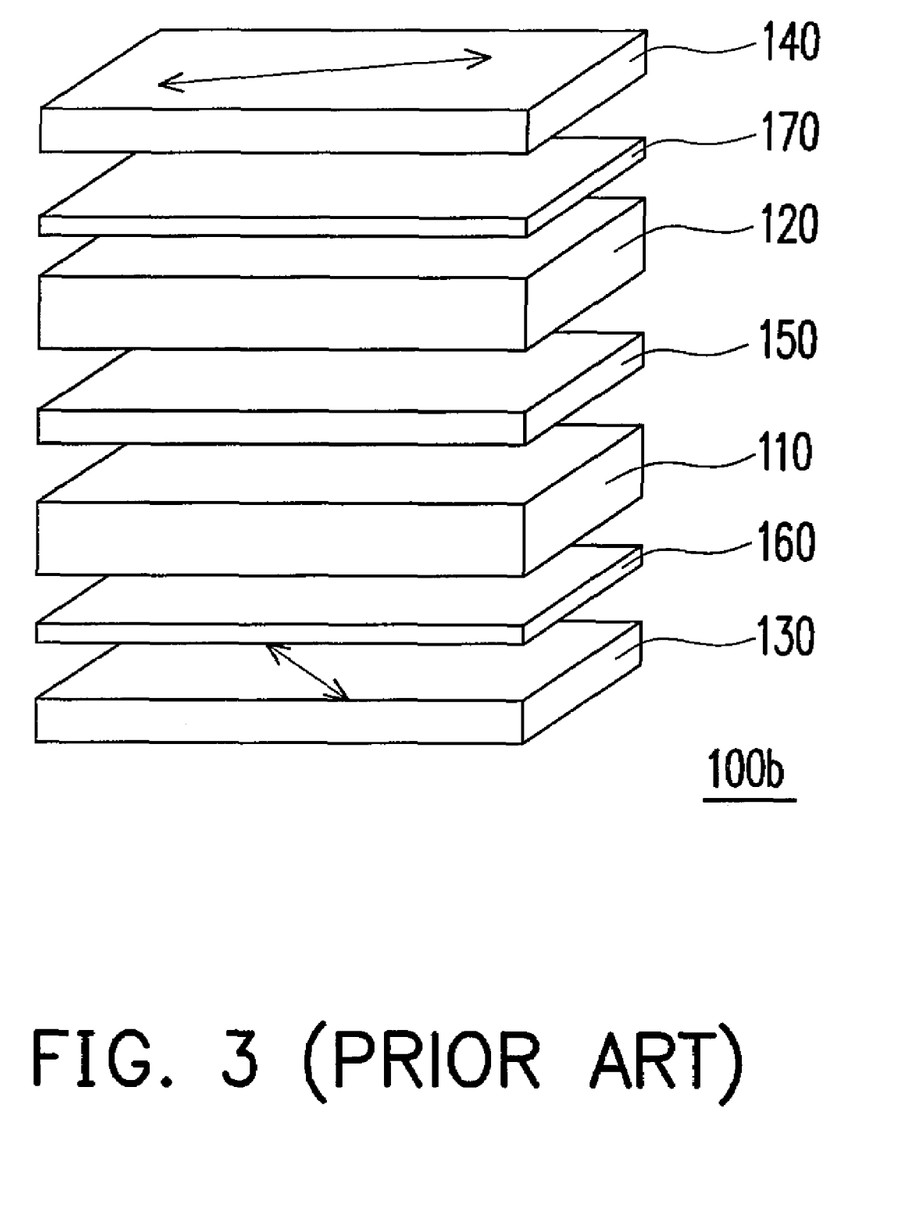
FIG. 3 is a schematic view showing the structure of another conventional twisted nematic liquid crystal display apparatus.

FIG. 3 is a schematic view showing the structure of another conventional twisted nematic liquid crystal display apparatus. Referring to FIG. 3, FIG. 3 is similar to FIG. 1. The difference between the two is that in order to widen the view angle, a conventional twisted nematic liquid crystal display apparatus 100b further includes a first compensation film 160 and a second compensation film 170. The first compensation film 160 is disposed between the first polarizer 130 and the TFT array substrate 110, and the second compensation film 170 is disposed between the second polarizer 140 and the color filter substrate 120. However, two extra compensation films 160 and 170 have to be added into the structure. As a result, no only are the cost and the overall thickness of the display increased, the additional elements also influence to a certain extent the reliability, the production yield and the life time of the liquid crystal display.

SUMMARY OF THE INVENTION

The present invention provides a liquid crystal display apparatus, wherein the view angle of the display is widened without any additional element.

The invention provides a liquid crystal display apparatus including a first protective layer, a first polarizing layer, a second protective layer, an active device array substrate, an opposite substrate, a twisted nematic liquid crystal layer, a third protective layer, a second polarizing layer and a fourth protective layer. The first polarizing layer is disposed on the first protective layer, and the second protective layer is disposed on the first polarizing layer. The active device array substrate is disposed on the second protective layer. The opposite substrate is disposed over the active device array substrate, and the twisted nematic liquid crystal layer is disposed between the opposite substrate and the active device array substrate. The third protective layer is disposed on the opposite substrate, the second polarizing layer is disposed on the third protective layer, and the fourth protective layer is disposed on the second polarizing layer. The second protective layer has a first in-plane retardation value ($R_o$) and a first out-of-plane retardation value ($R_{th}$). The range of the first in-plane retardation value is between 1 and 10 nanometers, and the range of the first out-of-plane retardation value is between 50 and 130 nanometers.

In one embodiment of the present invention, the range of the first in-plane retardation value is about 3 to 10 nanometers.

In one embodiment of the invention, the range of the first in-plane retardation value is about 5 to 10 nanometers.

In one embodiment of the invention, the range of the first out-of-plane retardation value is about 80 to 130 nanometers.

In one embodiment of the invention, the range of the first out-of-plane retardation value is about 100 to 130 nanometers.

In one embodiment of the invention, the third protective layer has a second in-plane retardation value and a second out-of-plane retardation value. The range of the second in-plane retardation value is between 1 and 10 nanometers, and the range of the second out-of-plane retardation value is between 50 and 130 nanometers.

In one embodiment of the invention, the range of the second in-plane retardation value is about 3 to 10 nanometers.

In one embodiment of the invention, the range of the second in-plane retardation value is about 5 to 10 nanometers.

In one embodiment of the invention, the range of the second out-of-plane retardation value is about 80 to 130 nanometers.

In one embodiment of the invention, the range of the second out-of-plane retardation value is about 100 to 130 nanometers.

The present invention provides a liquid crystal display apparatus including a first protective layer, a first polarizing layer, a second protective layer, an active device array substrate, an opposite substrate, a twisted nematic liquid crystal layer, a third protective layer, a second polarizing layer and a fourth protective layer. The first polarizing layer is disposed on the first protective layer, and the second protective layer is disposed on the first polarizing layer. The active device array substrate is disposed on the second protective layer, and the opposite substrate is disposed over the active device array substrate. The twisted nematic liquid crystal layer is disposed between the opposite substrate and the active device array substrate, the third protective layer is disposed on the opposite substrate, and the second polarizing layer is disposed on the third protective layer. The fourth protective layer is disposed on the second polarizing layer. The third protective layer has a second in-plane retardation value and a second out-of-plane retardation value. The range of the second in-plane retardation value is between 1 and 10 nanometers, and the range of the second out-of-plane retardation value is between 50 and 130 nanometers.

In one embodiment of the invention, the range of the second in-plane retardation value is about 3 to 10 nanometers.

In one embodiment of the invention, the range of the second in-plane retardation value is about 5 to 10 nanometers.

In one embodiment of the invention, the range of the second out-of-plane retardation value is about 80 to 130 nanometers.

In one embodiment of the invention, the range of the second out-of-plane retardation value is about 100 to 130 nanometers.

According to the aforementioned, the invention renders the ranges of the in-plane retardation value and the out-of-plane retardation value of the second protective layer and/or the third protective layer as 1 to 10 and 50 to 130 nanometers, respectively. The first protective layer and the fourth protective layer have only one function of protecting the polarizing layers. Hence, the second protective layer and/or the third protective layer can achieve the effect of a conventional compensation film so as to widen the view angle of a liquid crystal display apparatus. Moreover, since the optical characteristics of the second protective layer and/or the third protective layer are changed in the invention, compared with the prior art, not only does the liquid crystal display of the invention acquire good display quality at wide view angles without adding any extra element but the reliability of the product is also increased.

In order to the make the aforementioned and other objects, features and advantages of the present invention more comprehensible, some preferred embodiments accompanied with figures are described in detail below.

BRIEF DESCRIPTION OF THE DRAWINGS

FIG. 2 is the measurement results of horizontal view angles of the conventional twisted nematic liquid crystal display apparatus 100a.

DESCRIPTION OF EMBODIMENTS

Figure 4:
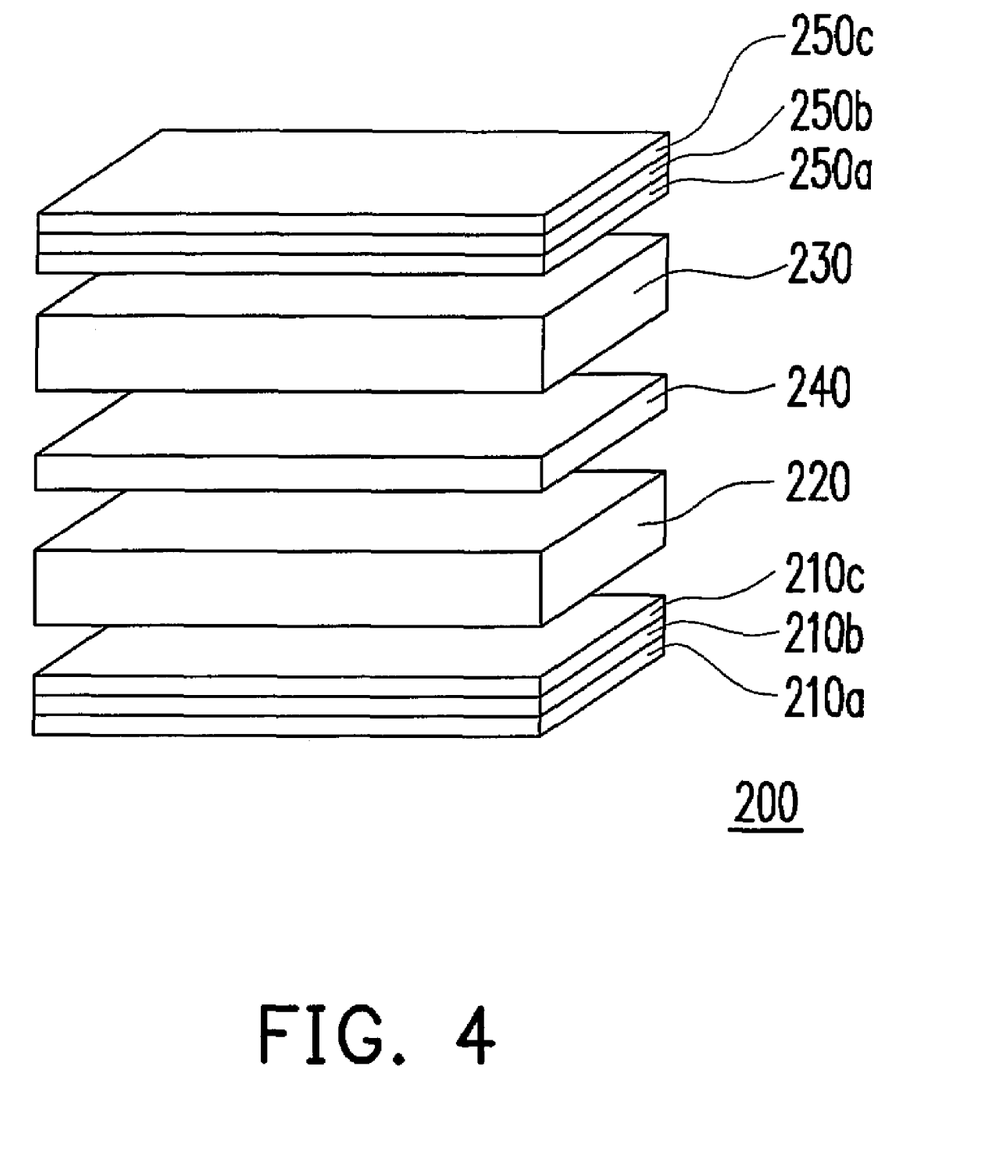
FIG. 4 is a schematic view showing the structure of a liquid crystal display apparatus according to one embodiment of the invention.
Figure 5A:
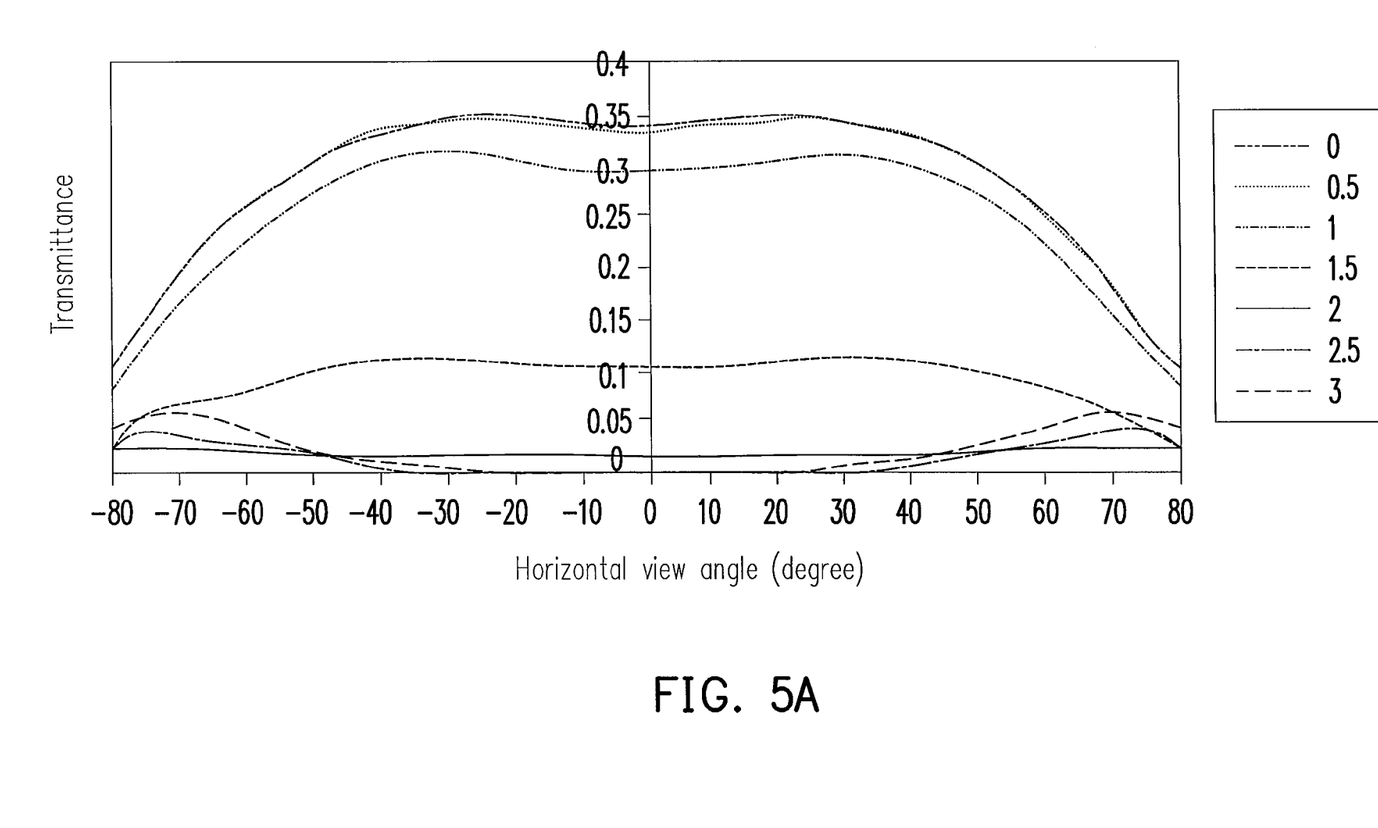
FIGS. 5A-5H are the measurement results of horizontal view angles of the liquid crystal display apparatus according to the present embodiment.
Figure 5B:
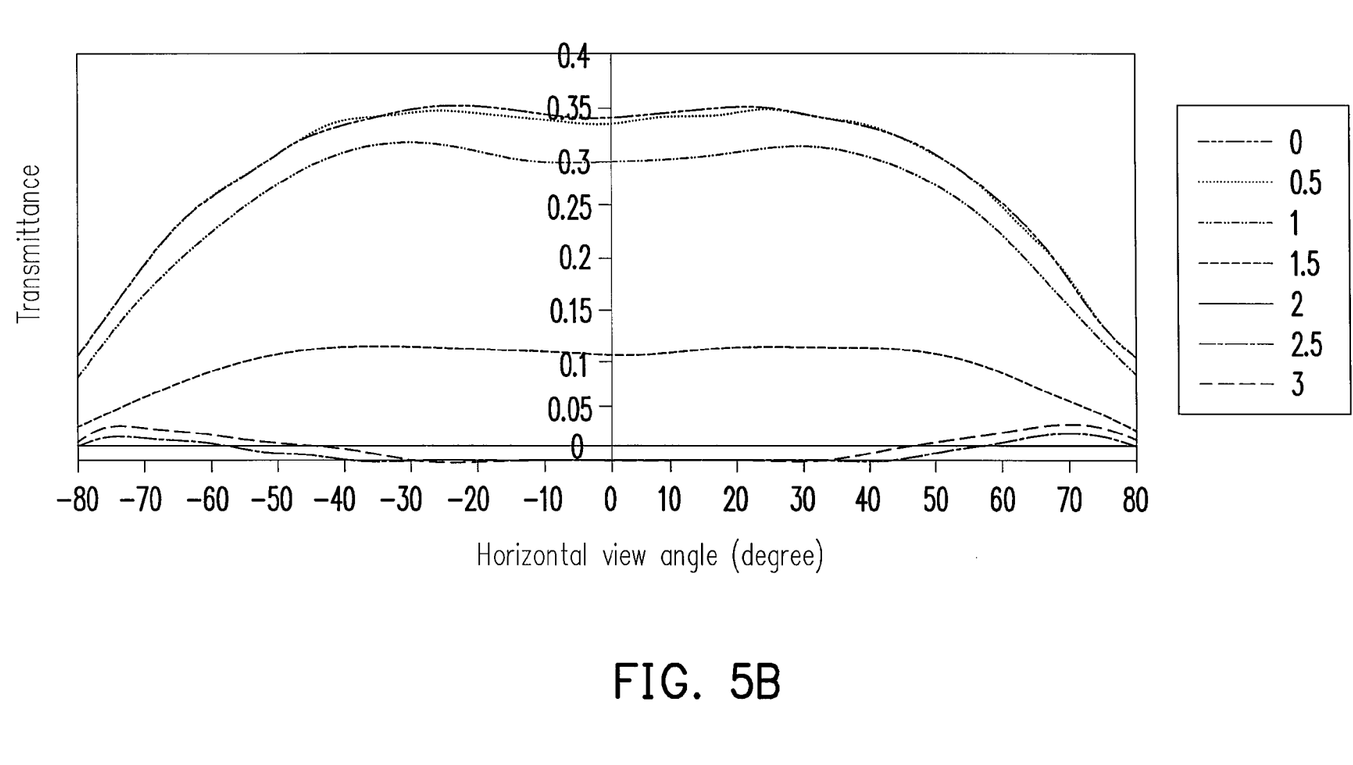
Figure 5C:
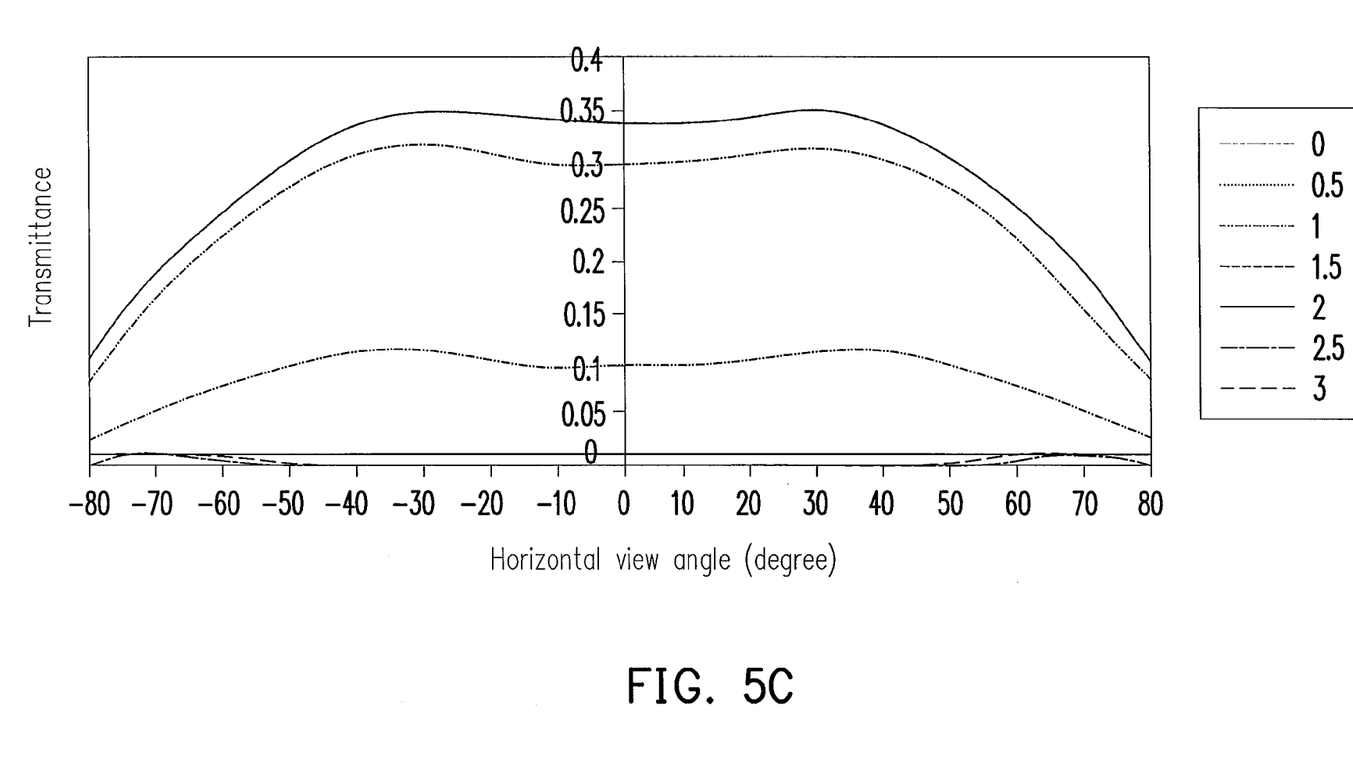
Figure 5D:
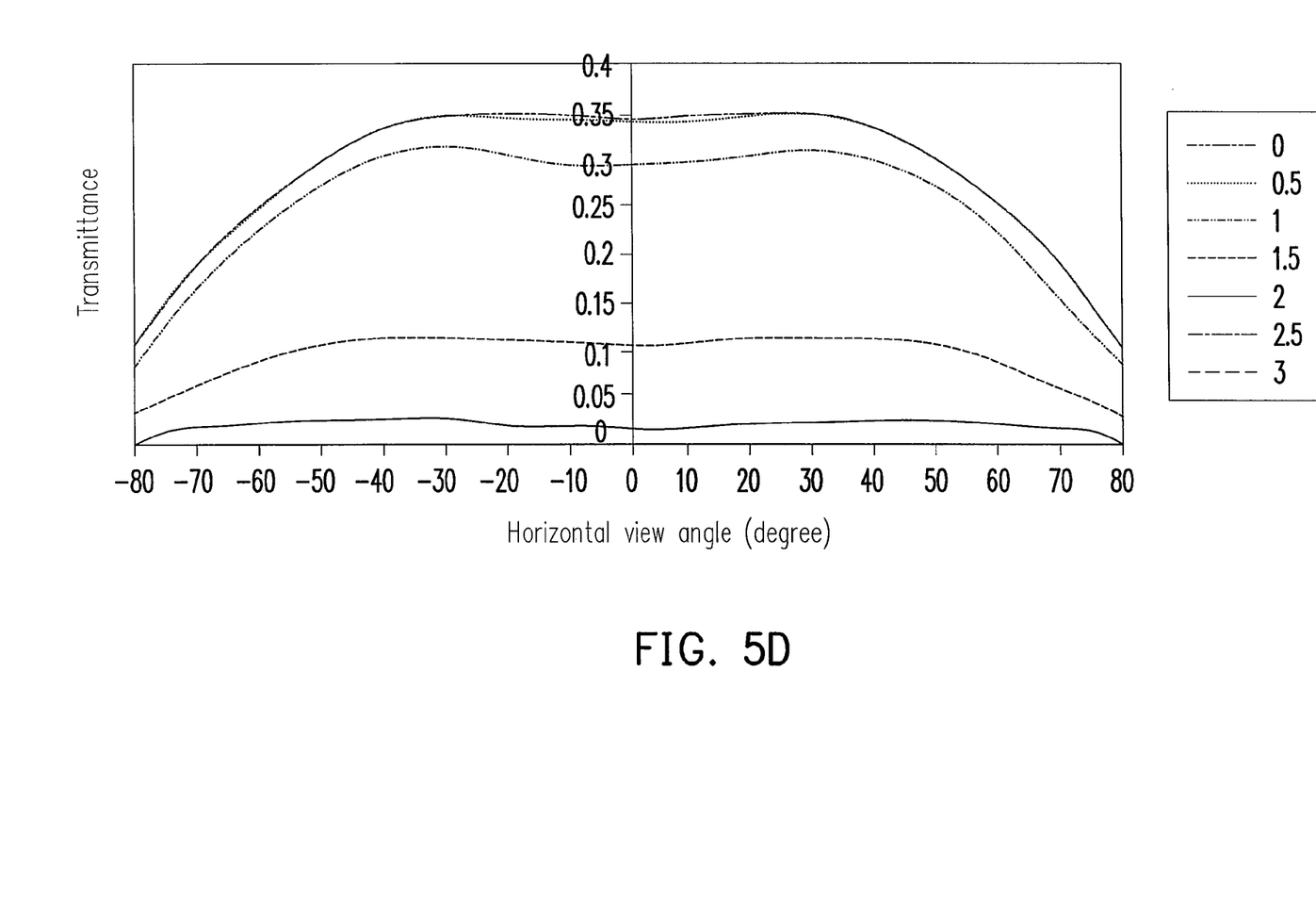
Figure 5E:
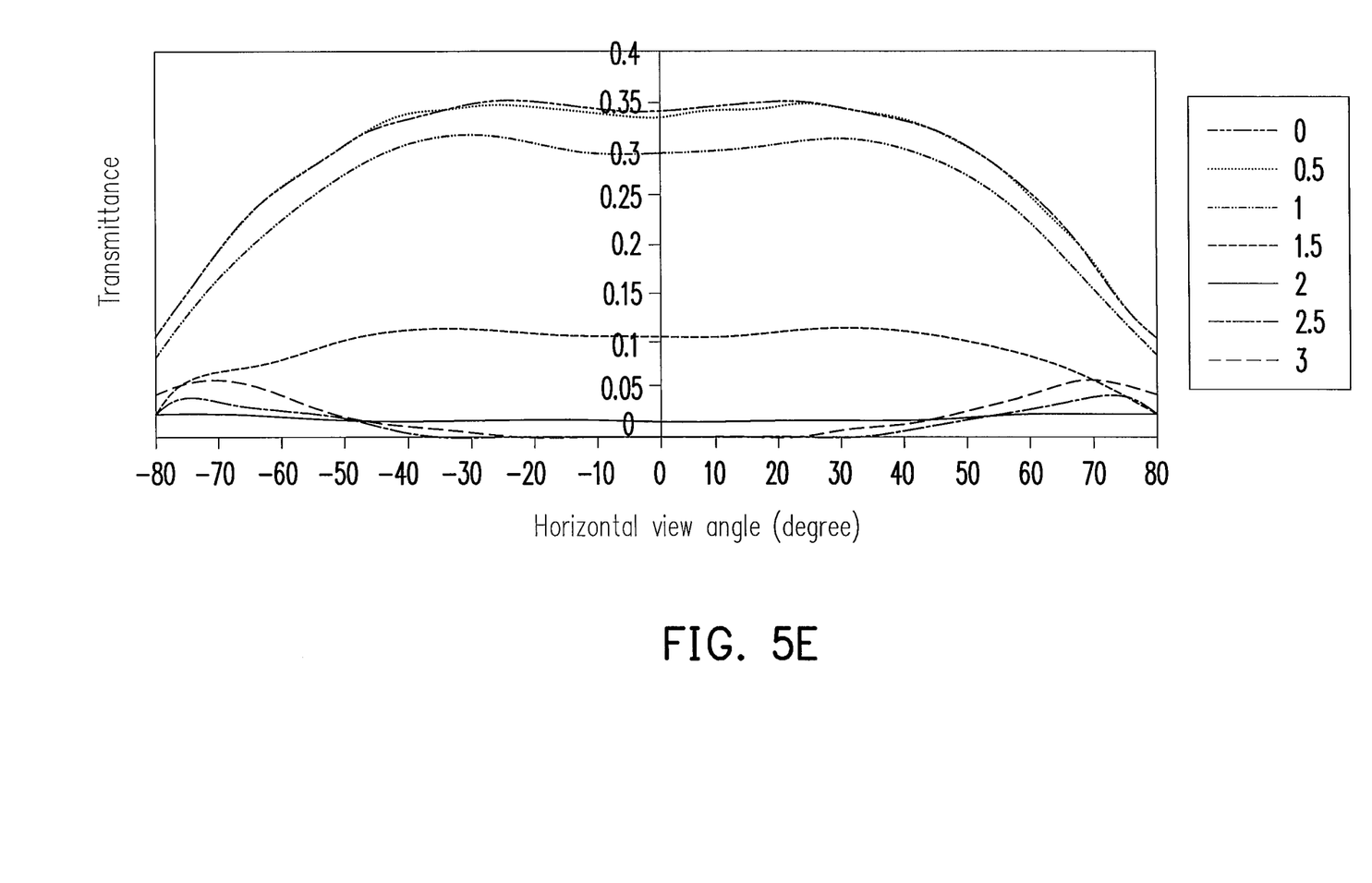
Figure 5F:
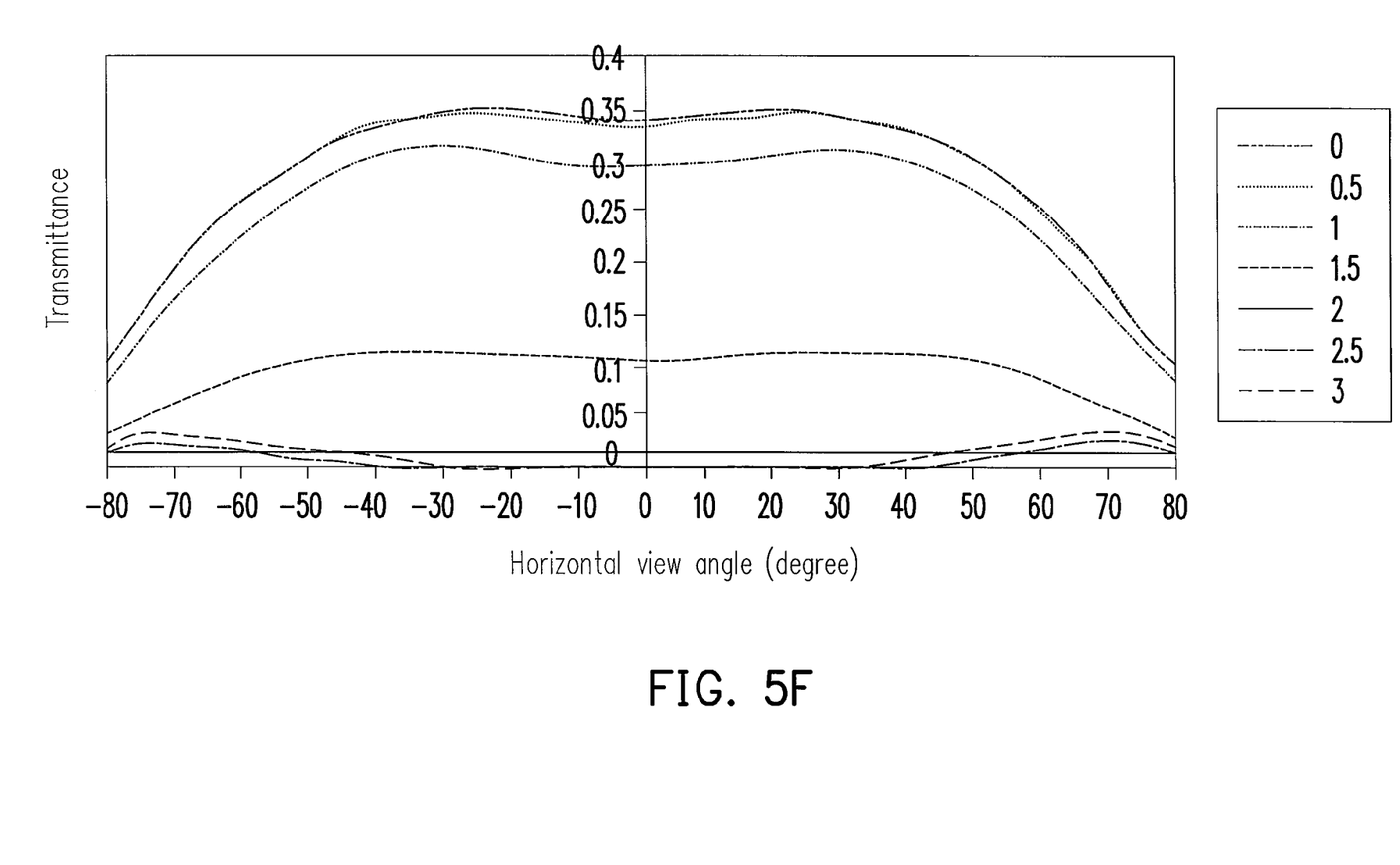
Figure 5G:
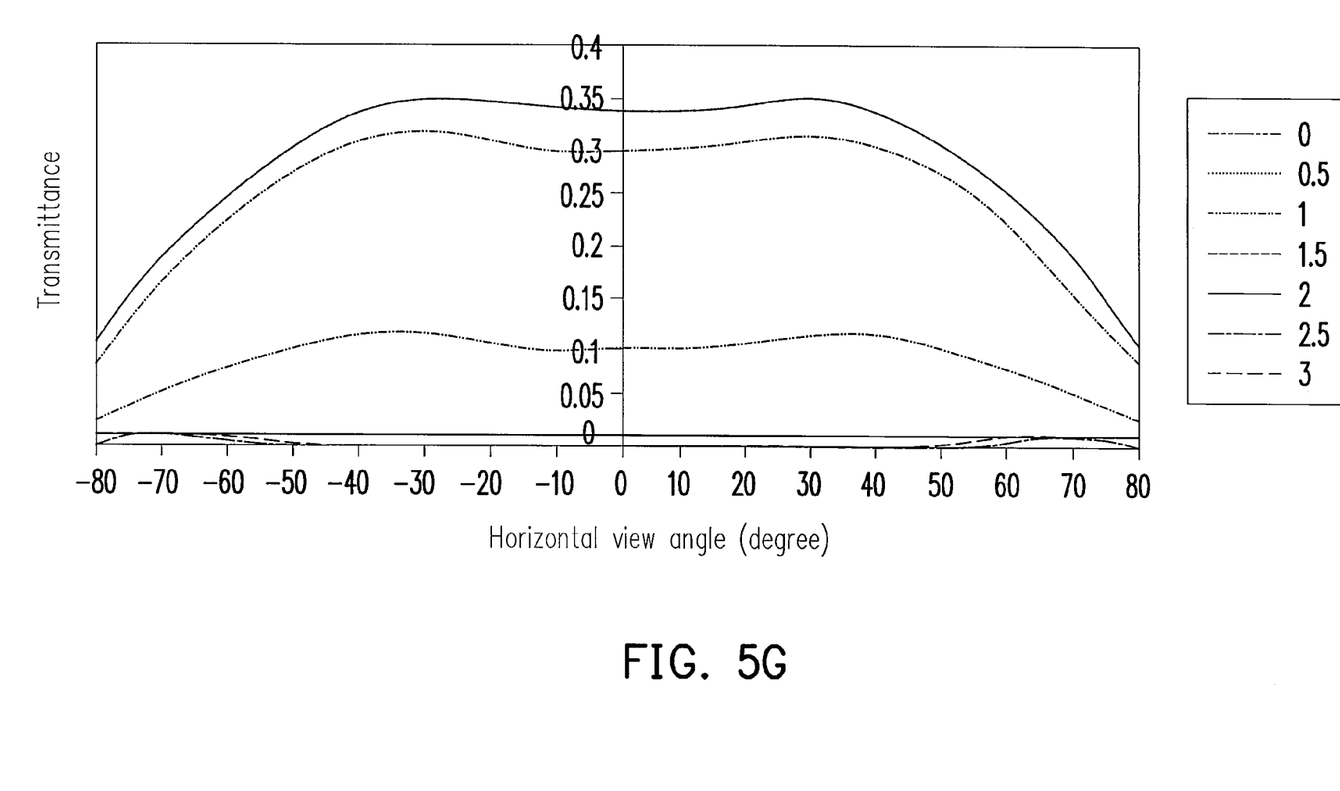
Figure 5H:
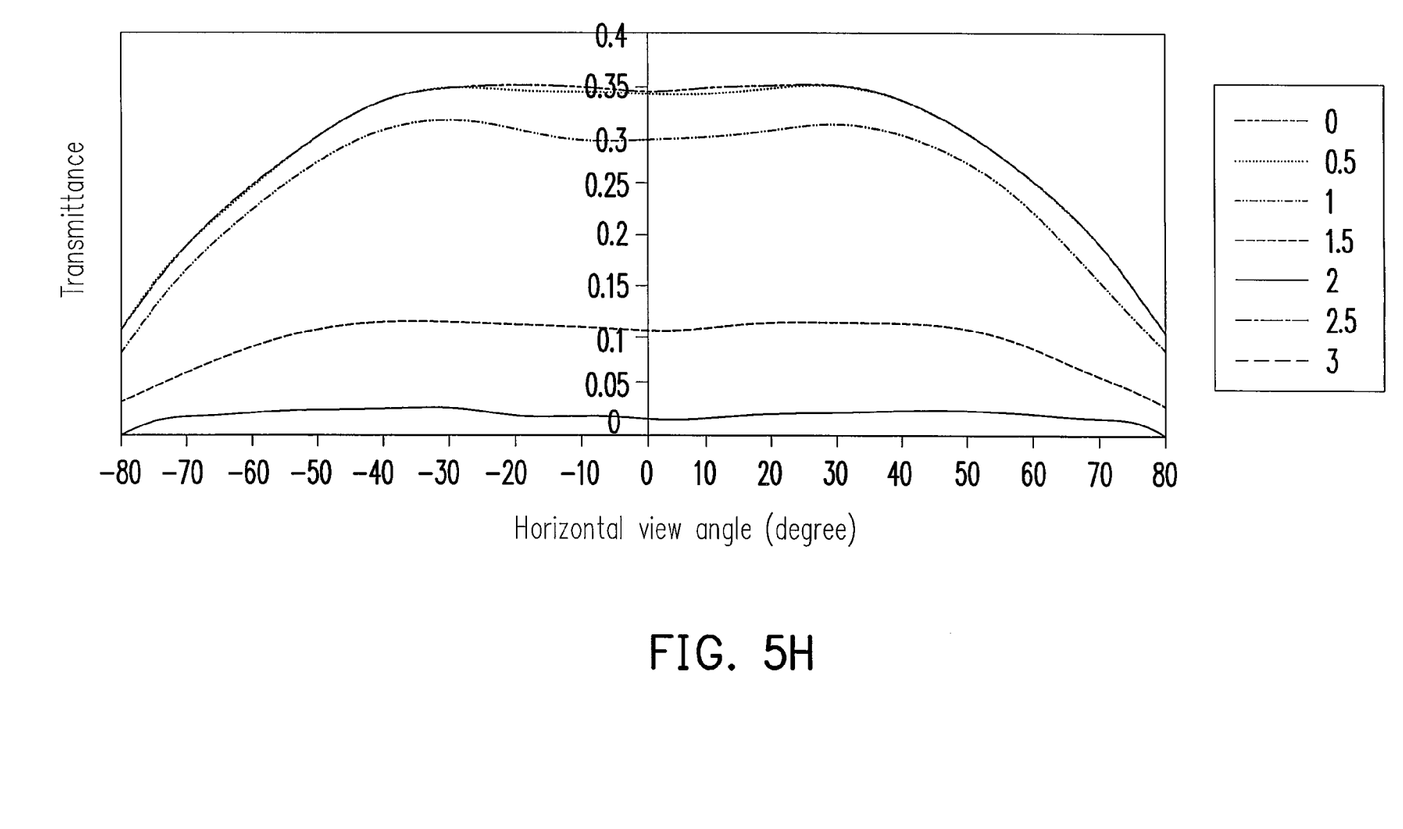

FIG. 4 is a schematic view showing the structure of a liquid crystal display apparatus according to one embodiment of the invention. Referring to FIG. 4, the liquid crystal display apparatus 200 of the present embodiment includes a first protective layer 210a, a first polarizing layer 210b, a second protective layer 210c, an active device array substrate 220, an opposite substrate 230, a twisted nematic liquid crystal layer 240, a third protective layer 250a, a second polarizing layer 250b and a fourth protective layer 250c. The first polarizing layer 210b is disposed on the first protective layer 210a, and the second protective layer 210c is disposed on the first polarizing layer 210b. The active device array substrate 220 is disposed on the second protective layer 210c, and the opposite substrate 230 is disposed over the active device array substrate 220. The twisted nematic liquid crystal layer 240 is disposed between the opposite substrate 230 and the active device array substrate 220, and the third protective layer 250a is disposed on the opposite substrate 230. The second polarizing layer 250b is disposed on the third protective layer 250a, and the fourth protective layer 250c is disposed on the second polarizing layer 250b.

In the present embodiment, the active device array substrate 220 is a TFT array substrate, and the opposite substrate 230 is a color filter substrate. Additionally, in the embodiment, the material of the first polarizing layer 210b and the second polarizing layer may be polyvinyl alcohol (PVA) or polycarbonate (PC). The material of the first protective layer 210a, the second protective layer 210c, the third protective layer 250a and the fourth protective layer 250c includes triacetylcellulose (TAC), glass, the acrylic, or the like.

More specifically, the second protective layer 210c has a first in-plane retardation value (hereinafter as $R_o1$) and a first out-of-plane retardation value (hereinafter as $R_{th}1$). Besides, $R_o1$ is between 1 and 10 nanometers (nm), the preferred range is between 3 and 10 nanometers, and the optimal range is between 5 and 10 nanometers. Further, $R_{th}1$ is between 50 and 130 nanometers, the preferred range is between 80 and 130 nanometers, and the optimal range is between 100 and 130 nanometers.

The third protective layer 250a has a second in-plane retardation value (hereinafter as $R_o2$) and a second out-of-plane retardation value (hereinafter as $R_{th}2$). Besides, $R_o2$ is between 1 and 10 nanometers, the preferred range is between 3 and 10 nanometers, and the optimal range is between 5 and 10 nanometers. Further, $R_{th}2$ is between 50 and 130 nanometers, the preferred range is between 80 and 130 nanometers, and the optimal range is between 100 and 130 nanometers.

More specifically, the present embodiment is mainly to change the optical characteristics of the second protective layer 210c and the third protective layer 250a so as to widen the view angle. In addition, the first protective layer 210a has an only function of protecting the first polarizing layer 210b, and the fourth protective layer 250c also has only one function of protecting the second polarizing layer 250b. Nevertheless, in other embodiments, if only the optical characteristics of the second protective layer 210c or those of the third protective layer 250a are changed, the object of widening the view angle can also be achieved.

FIGS. 5A-5H are the measurement results of horizontal view angles of the liquid crystal display apparatus according to the present embodiment. Referring to FIGS. 5A-5H, the horizontal axis is the horizontal view angle, the vertical axis is the transmittance, and the vertical axis also represents the luminance. Further, different curves represent the results of the liquid crystal display apparatus of the embodiment under different operating voltages.

The results in FIGS. 5A-5H in order are $(R_o1, R_{th}1)=(R_o2, R_{th}2)=(5, 50), (5, 80), (5, 100), (5, 130), (10, 50), (10, 80), (10, 100)$ and $(10, 130)$. As seen from the measurement results shown in FIGS. 5A-5H, all the above ranges can widen the horizontal view angle of the liquid crystal display apparatus 200. Even in FIGS. 5D and 5H, in other words, when $(R_o1, R_{th}1)=(R_o2, R_{th}2)$ are $(5, 130)$ and $(10, 130)$, there is little existence of the gray scale inversion phenomenon.

In view of the above, the liquid crystal display apparatus 200 of the embodiment not only widens the view angle, but also improves the display quality and lowers the production cost without adding any extra element.

In summary, the optical characteristics of the second protective layer and/or the third protective layer in the present invention are changed so as to widen the view angle without adding any extra element. More specifically, the optical characteristics of the second protective layer and/or the third protective layer are changed in order to resolve the problem of the gray scale inversion.

Although the present invention has been disclosed above by the preferred embodiments, they are not intended to limit the present invention. Anybody skilled in the art can make some modifications and alteration without departing from the spirit and scope of the present invention. Therefore, the protecting range of the present invention falls in the appended claims.

What is claimed is:

1. A liquid crystal display (LCD) apparatus, comprising:
   a first protective layer;
   a first polarizing layer disposed on the first protective layer;
   a second protective layer disposed on the first polarizing layer, the second protective layer having a first in-plane retardation value and a first out-of-plane retardation value, wherein the first in-plane retardation value is between 1 and 10 nanometers and the out-of-plane retardation value is between 50 and 130 nanometers;
   an active device array substrate disposed on the second protective layer;
   an opposite substrate disposed over the active device array substrate;
   a twisted nematic liquid crystal layer disposed between the opposite substrate and the active device array substrate;
   a third protective layer disposed on the opposite substrate;
   a second polarizing layer disposed on the third protective layer; and
   a fourth protective layer disposed on the second polarizing layer.

2. The LCD apparatus of claim 1, wherein the range of the first in-plane retardation value is 3 to 10 nanometers.

3. The LCD apparatus of claim 2, wherein the range of the first in-plane retardation value is 5 to 10 nanometers.

4. The LCD apparatus of claim 1, wherein the range of the first out-of-plane retardation value is 80 to 130 nanometers.

5. The LCD apparatus of claim 4, wherein the range of the first out-of-plane retardation value is 100 to 130 nanometers.

6. The LCD apparatus of claim 1, wherein the third protective layer has a second in-plane retardation value and a second out-of-plane retardation value, the second in-plane retardation value being between 1 and 10 nanometers, the second out-of-plane retardation value being between 50 and 130 nanometers.

7. The LCD apparatus of claim 6, wherein the range of the second in-plane retardation value is 3 to 10 nanometers.

8. The LCD apparatus of claim 7, wherein the range of the second in-plane retardation value is 5 to 10 nanometers.

9. The LCD apparatus of claim 6, wherein the range of the second out-of-plane retardation value is 80 to 130 nanometers.

10. The LCD apparatus of claim 9, wherein the range of the second out-of-plane retardation value is 100 to 130 nanometers.

11. A liquid crystal display (LCD) apparatus, comprising:
    a first protective layer;
    a first polarizing layer disposed on the first protective layer;
    a second protective layer disposed on the first polarizing layer;
    an active device array substrate disposed on the second protective layer;
    an opposite substrate disposed over the active device array substrate;
    a twisted nematic liquid crystal layer disposed between the opposite substrate and the active device array substrate;
    a third protective layer disposed on the opposite substrate, the third protective layer having a second in-plane retardation value and a second out-of-plane retardation value, wherein the second in-plane retardation value is between 1 and 10 nanometers and the second out-of-plane retardation value is between 50 and 130 nanometers;
    a second polarizing layer disposed on the third protective layer; and
    a fourth protective layer disposed on the second polarizing layer.

12. The LCD apparatus of claim 11, wherein the range of the second in-plane retardation value is 3 to 10 nanometers.

13. The LCD apparatus of claim 12, wherein the range of the second in-plane retardation value is 5 to 10 nanometers.

14. The LCD apparatus of claim 11, wherein the range of the second out-of-plane retardation value is 80 to 130 nanometers.

15. The LCD apparatus of claim 14, wherein the range of the second out-of-plane retardation value is 100 to 130 nanometers.

* * * * *